United States Patent
Grimes et al.

(10) Patent No.: US 12,426,603 B2
(45) Date of Patent: Sep. 30, 2025

(54) KIT AND METHOD FOR IMPARTING COLOR TO FOOD MATERIAL

(71) Applicants: Brenda M. Grimes, Ft. Myers, FL (US); Charles W. Grimes, Ft. Myers, FL (US)

(72) Inventors: Brenda M. Grimes, Ft. Myers, FL (US); Charles W. Grimes, Ft. Myers, FL (US)

(*) Notice: Subject to any disclaimer, the term of this patent is extended or adjusted under 35 U.S.C. 154(b) by 649 days.

(21) Appl. No.: 17/677,426

(22) Filed: Feb. 22, 2022

(65) Prior Publication Data

US 2022/0174965 A1    Jun. 9, 2022

Related U.S. Application Data

(60) Continuation-in-part of application No. 16/824,515, filed on Mar. 19, 2020, now Pat. No. 11,633,896, (Continued)

(51) Int. Cl.
| | |
|---|---|
| *A21C 15/00* | (2006.01) |
| *A23G 3/28* | (2006.01) |
| *B29C 48/05* | (2019.01) |
| *B29C 48/06* | (2019.01) |
| *B29C 48/09* | (2019.01) |
| *B29C 48/12* | (2019.01) |
| *B29C 48/13* | (2019.01) |

(52) U.S. Cl.
CPC ............ *A21C 15/005* (2013.01); *B29C 48/05* (2019.02); *B29C 48/06* (2019.02); *B29C 48/09* (2019.02); *B29C 48/12* (2019.02); *B29C 48/13* (2019.02); *A23G 3/28* (2013.01); *Y10S 425/044* (2013.01)

(58) Field of Classification Search
CPC ................................ A23G 3/28; A21C 15/005
See application file for complete search history.

(56) References Cited

U.S. PATENT DOCUMENTS

| | | | | |
|---|---|---|---|---|
| 2,539,944 A | * | 1/1951 | Bury | ......................... A23G 3/28 425/191 |
| 2,620,756 A | * | 12/1952 | Krens | ....................... A23G 3/28 425/191 |

(Continued)

FOREIGN PATENT DOCUMENTS

DE        3517327 A   *  11/1986   ........... A21C 15/005

OTHER PUBLICATIONS

English Translation for DE-3517327-A (Year: 1986).*

*Primary Examiner* — Seyed Masoud Malekzadeh
(74) *Attorney, Agent, or Firm* — Charles W. Grimes

(57) ABSTRACT

A kit for use in turning plain food material into a stream of food material with sides having different colors. The kit may include: a cylindrical tube that serves as both a packaging container and filling stand; a pastry bag which fits within the tube during shipping and storage and which can be suspended within the tube at a crucial position during use for striping, frosting filling and closing purposes; an output nozzle that fits within the pastry bag and, once the pastry bag is striped, filled with frosting and closed, serves to achieve the desired frosting material output shape; a tube of coloring gel; a coloring gel spreading stick; a closure clip; graphic instructions printed on the outside of the tube explaining the steps for using the kit; and a QR code that lets the user play a video showing how the kit components are used.

15 Claims, 10 Drawing Sheets

Related U.S. Application Data which is a continuation-in-part of application No. 16/358,399, filed on Mar. 19, 2019, now abandoned, which is a continuation-in-part of application No. 15/804,801, filed on Nov. 6, 2017, now Pat. No. 10,315,348, which is a continuation-in-part of application No. 13/852,507, filed on Mar. 28, 2013, now Pat. No. 9,808,977, which is a division of application No. 13/366,863, filed on Feb. 6, 2012, now Pat. No. 8,790,110, which is a continuation-in-part of application No. 13/184,021, filed on Jul. 15, 2011, now Pat. No. 8,794,959.

(56) References Cited

U.S. PATENT DOCUMENTS

| | | | | | |
|---|---|---|---|---|---|
| 3,285,202 | A | * | 11/1966 | MacManus | A23G 3/2069 285/260 |
| 3,632,021 | A | * | 1/1972 | MacManus | A21C 15/005 222/496 |
| 3,866,838 | A | * | 2/1975 | Miles | B05C 17/002 239/372 |
| 4,205,765 | A | * | 6/1980 | May | A21C 15/005 222/107 |
| 4,961,517 | A | * | 10/1990 | Tkac | A23G 3/203 383/111 |
| 5,114,044 | A | * | 5/1992 | Spanek, Jr. | A21C 15/005 383/906 |
| 6,047,858 | A | * | 4/2000 | Romer | A23G 3/28 222/326 |
| 6,179,165 | B1 | * | 1/2001 | Knight | B65D 31/18 222/107 |
| 6,968,873 | B1 | * | 11/2005 | Cariddi | A23G 3/2007 426/115 |
| 8,201,709 | B1 | * | 6/2012 | Namigata | A21C 15/005 222/475 |
| 2003/0091702 | A1 | * | 5/2003 | Folkmar | A23G 3/2015 426/115 |
| 2004/0112915 | A1 | * | 6/2004 | Franczyk | A21C 15/005 222/569 |
| 2008/0041878 | A1 | * | 2/2008 | Day | A21C 15/005 222/107 |
| 2009/0127287 | A1 | * | 5/2009 | Faller | A21C 15/005 222/107 |
| 2012/0014622 | A1 | * | 1/2012 | Schwallie | B65D 33/065 383/105 |
| 2012/0294667 | A1 | * | 11/2012 | Krcma | A23G 3/28 401/160 |

\* cited by examiner

KIT AND METHOD FOR IMPARTING COLOR TO FOOD MATERIAL

CROSS-REFERENCE TO RELATED APPLICATIONS

This application is a continuation-in-part of U.S. patent application Ser. No. 16/824,515, filed on Mar. 19, 2020 now issued as U.S. Pat. No. 11,633,896, which is a continuation-in-part of U.S. patent application Ser. No. 16/358,399, filed on Mar. 19, 2019 (abandoned), which is a continuation-in-part of U.S. patent application Ser. No. 15/804,801, filed on Nov. 6, 2017 (issued on Jun. 11, 2019 as U.S. Pat. No. 10,315,348), which is a continuation-in-part of U.S. patent application Ser. No. 13/852,507, filed on Mar. 28, 2013 (issued on Nov. 7, 2017 as U.S. Pat. No. 9,808,977), which is a divisional of U.S. patent application Ser. No. 13/366,863, filed on Feb. 6, 2012 (issued on Jul. 29, 2014 as U.S. Pat. No. 8,790,110), which is a continuation-in-part of U.S. patent application Ser. No. 13/184,021, filed on Jul. 15, 2011 (issued on Aug. 5, 2014 as U.S. Pat. No. 8,794,959). The entire disclosures of those applications are hereby incorporated herein by reference. Collectively, such prior filings are referred to herein as the "Parent Filings".

BACKGROUND OF THE INVENTION

If a person wants to create an output with multiple colors, i.e., a stream of food material with sides having different colors, the person could use a cumbersome apparatus such as the Wilton ColorSwirl™ 3 Color Coupler, 411-1992. The aforementioned Wilton device requires the use of multiple bags of colored frosting, brought together with a multi-channel coupler. This device, wherein the user is effectively expected to simultaneously handle multiple bags of colored frosting, is cumbersome and unwieldy—both in "set up" and during use.

Alternatively, the person could use a traditional pastry bag, coupler plug, nozzle and mating coupler collar, i.e., a traditional Disposable Decorating Bag ("DDB") apparatus, and "stripe" the bag with coloring gels on the internal wall of the bag in a well-known manner, before insertion of the food material, in order to impart color to the food material upon extrusion. This approach is difficult (if not impossible for many people) in that it requires the user to: (i) continuously hold the DDB in one hand while trying to undertake the myriad steps involved in "striping" the inside wall of the DDB with coloring gels, e.g., if the user puts the bag down, the bag will collapse on itself and the coloring gel already applied will either undesirably spread to the opposing inside wall or, worse still, interact with and discolor the coloring gel applied to the opposing wall; (ii) then continuing to hold the DDB in their one hand while trying to simultaneously scoop frosting out of a can or tub and fill the DDB with the frosting, including periodically shaking the DDB to clear air pockets of bubbles from the frosting; and (iii) finally, trying to hold the DDB in their one hand while twisting the DDB closed with the other hand and possibly applying a closure mechanism; all of which tasks are difficult if not impossible for users with small hands or who lack manual dexterity.

If a person wants to create an output with a three-dimensional ribbon candy design, i.e., a stream of food material with channels having alternating stripes of color: (i) on the channel peaks; and (ii) in the channel valleys; it is not possible with either the aforementioned Wilton Color-Swirl™ device or with any prior art DDB apparatus and the aforementioned "striping" method.

What the prior art lacks is a kit and a method for uniquely and collaboratively using component parts to easily create output with multiple colors, i.e., a stream of food material with sides having different colors, and more particularly in a preferred embodiment, output with a three-dimensional ribbon candy design, i.e., a stream of food material with channels having alternating stripes of color on the channel peaks and in the channel valleys.

Prior art references concerning decorating, dispensing and icing bags do not disclose the unique features or advantages of this invention. Patents noted but not believed to be relevant to the novelty or non-obviousness of this invention include: Parker et al. U.S. Pat. No. 2,723,779; DeLorimiere U.S. Pat. No. 4,844,917; Tkac U.S. Pat. No. 4,961,517; Wallays U.S. Pat. No. 5,758,802; Wallays U.S. Pat. No. 5,931,346; Tedeschi, Jr. et al. U.S. Pat. No. 6,065,651; Gross et al. U.S. Pat. No. 6,273,307 B1; Lunghetti U.S. Pat. No. 6,386,395 B1; Franczyk U.S. Pat. No. 7,021,505 B2; Folkmar PCT No. WO 2004/049816 A1; Ejeblad PCT No. WO 2005/115162 A1; and Ejeblad PCT No. WO 2007/090588 A1 and the various prior art references heretofore cited in connection with the prosecution of the Parent Filings.

There has for some time existed a significant motivation for the creation of the kit and method of this invention. Specifically, consumers have always been seeking ways to colorfully decorate cupcakes and cakes with colors tied to a particular festive occasion, for example, birthdays, quinceañeras, graduations, weddings, anniversaries, holidays such as Valentine's Day, St. Patrick's Day, Easter, Patriotic Days (Memorial Day, Juneteenth, July 4, Labor Day), Halloween, Thanksgiving, Hanukkah, Christmas, Kwanzaa and New Year's, and other celebratory occasions such as sports competitions and spirit days where decorations include the colors of a favorite team or group. And yet, despite that motivation, prior to applicant's invention, no one conceived and reduced to practice the kit and method of this invention which makes the act of colorfully decorating cupcakes and cakes so simple and easy.

The commercial potential for the kit and method of this invention has existed for some time. One look no further than the extensive commercialization that has been possible of Easter egg dying kits. Indeed, when manufacturers saw how consumers happily purchased such Easter egg dying kits, it was only a matter of time before they invented Halloween carving kits. And yet, there are no other types of celebratory kits. Self-evidently, in the same way that greeting card companies have exploded to where there isn't an occasion in connection with which a relevant card is not sold, it is surprising that manufacturers have not created kits and methods such as the kit and method of this invention to help consumers celebrate other festive occasions besides Easter and Halloween. But the reality is that they haven't, despite that commercial potential. What's more, with the present invention the opportunity arises to sell consumers "subscriptions" whereby they receive the holiday kits of this invention throughout the year. The opportunity to effectuate subscription sales is a highly sought-after business model. And still, no one conceived of and reduced to practice the kit and method of this invention.

The inescapable fact is that no one has conceived and reduced to practice the kit and method of this invention because the kit and method of this invention are novel and non-obvious.

SUMMARY OF THE INVENTION

This invention pertains to a kit and method which are both novel and unique.

More specifically, this invention pertains to a kit which comprises a novel and unique combination of components, namely: (i) a cylindrical tube that serves as both a packaging container and filling stand; (ii) a pastry bag which fits within the tube during shipping and storage and which can be suspended within the tube at a crucial position during use for striping, frosting filling and closing purposes; (iii) an output nozzle that fits within the pastry bag and, once the pastry bag is striped, filled with frosting and closed, serves to achieve the desired frosting material output shape; (iv) at least one tube of coloring gel; (v) at least one coloring gel spreading stick; (vi) at least one closure clip; (vii) graphic instructions printed on the outside of the tube explaining the steps for using the kit; and (viii) a QR code printed on the outside of the tube which allows the user to capture the QR code with their smartphone camera and thereby cause a "How To" video to play on their smartphone showing how the kit components are used together.

The first component, the cylindrical tube, performs both as the packaging container for the kit and as the filling stand for the kit. The dimensioning of the cylindrical tube is critical. First, the length and diameter of the tube are critical in that the tube must have an internal volume large enough to be capable of carrying all of the other components of the kit within it for shipping and storage purposes, i.e., the aforementioned pastry bag(s), output nozzle(s), tube(s) of coloring gel, gel spreading stick(s) and closure clip(s). Second, the length and diameter of the tube are critical in that the tube must be capable of: (i) being held by the user in their one hand and tilted in order to easily permit the user to insert the bag into the tube with their other hand through a first end and advance the bag into the tube by pulling the bag from the second end; (ii) standing by itself on a counter surface while the user uses both hands to fold the top of the bag over the rim of the tube and to pull the top of the bag taut against the rim of the tube to seat the bag in a predetermined position; (iii) being easily held by the user in one hand while the user stripes the inside wall of the bag during the striping process; (iv) holding the pastry bag in the predetermined position within the tube during the striping process, i.e., while the user tilts the tube to apply coloring gel to the inside wall of the bag, the bag must not "collapse" and the wall of the bag on which the coloring gel is being applied must remain taut; (v) being intermittently rested on a counter during the striping process, i.e., as the user prepares each step of the striping process; (vi) being rested on a counter during the frosting filling process, i.e., as frosting is dropped into the bag which is solidly held within the tube, and when the tube is tapped on the counter to remove air bubbles from the frosting; and, finally; (vii) being rested on a counter during the bag closing process. In other words, the dimensioning of the tube must be such that the tube is able to hold the pastry bag in a desired position, the tube is able to be gripped and held by the user with one hand and the tube is able to be stood on its own on a counter.

The second component, the pastry bag, receives the striping and frosting and, once closed and removed from the tube/filling stand, must dispense the desired output with multiple colors. The dimensioning of the pastry bag is critical, in that the pastry bag must: (i) be capable of being inserted into the tube/filling stand through a first end and advanced into the tube by pulling the bag through the second end; (ii) be capable of being folded back over the rim of such first end so that the desired extent of insertion of the bag into the tube is achieved; (iii) be capable of being suspended in a stationary position inside the tube once positioned inside the tube to facilitate the striping process; (iv) be capable of holding the output nozzle at a predetermined distance from the second end of the tube in order to suspend the nozzle above the rim of the second end when the tube is set on the counter during both the striping and filling processes, i.e., so that the end of the nozzle never touches the counter—including most notably during the process of tapping the tube as it carries the bag on the counter to remove air pockets from the frosting.

The third component, the output nozzle, determines the shape of the output. The nozzle can be attached to the pastry bag in the manner well-known in the prior art using a coupler. Alternatively, in a preferred embodiment, the output nozzle is the unique nozzle that is attached to the pastry bag as covered by the claims of the Parent Filings. In either case, the dimensioning of the output nozzle is critical, in that the output nozzle, when inserted into and suspended as part of the pastry bag within the tube, must not extend outside of the rim of the second end of the tube. In other words, the output end of the nozzle must not touch the counter either when the tube is rested on the counter during the striping and filling processes or, most notably, when the user taps the tube as it carries the bag filled with frosting on the counter to remove air pockets from the frosting.

The fourth component, coloring gel from the tube of coloring gel, is applied to the inside wall of the pastry bag during the striping process. The design of the tube is critical in that the tube must be able to be squeezed to cause the coloring gel to dispense onto a predetermined area of the coloring gel spreading stick. The consistency of the coloring gel is also critical, i.e., the coloring gel must have viscosity such that it adheres and does not "run" first when applied to the coloring gel spreading stick and second when applied to the inside wall of the pastry bag.

The fifth component, the coloring gel spreading stick, is used to apply the coloring gel to the inside wall of the pastry bag. The dimensioning of the coloring gel spreading stick is critical, i.e., the stick must fit inside the tube during shipment and storage, and yet, be long enough to have two sections, the first section where the stick remains free of coloring gel and can be held by the user and the second section where the coloring gel is applied and is long enough to enable the user to insert the coloring gel spreading stick into the pastry bag and apply the coloring gel to the inside wall of the bag from a first point just above where the bag and nozzle connect to a second point where the bag folds over the rim of the tube.

The sixth component, the closure clip, is used to keep the pastry bag closed so that the user can use both hands when dispensing the colored frosting. The design of the closure clip is critical in that, after the user twists the top of the pastry bag closed, the user must be able to apply the clip with one hand while the user holds the twisted pastry bag closed with the other hand The closure clip is made from a flexible plastic and is designed so that the user can attach the clip onto the twisted pastry bag with one hand, i.e., the ends of the clip are forced apart as the clip is pushed against the twisted portion of the bag and when the clip envelops the bag the user rotates the ends of the clip until they interlock in the closed position. The size of the closure clip is critical in that the clip must tightly engage the twisted closed end of the pastry bag so that no frosting escapes out of the top of the pastry bag as the user applies pressure to the pastry bag to dispense the colored frosting out through the nozzle.

The seventh component, the graphic illustration, provides a readily available set of step-by-step instructions which can be referred to by the user when considering whether to purchase the kit and during use of the components of the kit The eighth component, the QR code, provides a readily accessible "How To" video which the user can watch while considering whether to purchase the kit and can play on their smartphone during use of the components of the kit.

In an alternative embodiment, the kit of this invention is designed to be used with an inventive nozzle, which is the nozzle disclosed in FIG. 2 of U.S. Pat. No. 8,794,959 (and in FIG. 1 hereof). The inwardly extending serrations or ridges of the inventive nozzle cause the material to be "treated" as it is expelled to yield a three-dimensional ribbon candy design, i.e., a stream of food material with channels having alternating stripes of color on the channel peaks and in the channel valleys.

With either embodiment of the kit, the user can: (a) hold the tube in one hand while inserting the pastry bag and attached nozzle into the tube with the other hand; (b) rest the tube on the counter while folding the end of the pastry bag back over the rim of the tube and pulling the bag so that the bag tautly engages against the rim with both hands to thereby achieve the desired positioning of the pastry bag and nozzle within the tube; (c) hold the tube carrying the pastry bag and nozzle in one hand while striping the inside wall of the pastry bag with the other hand with one or more coloring gels using the coloring gel spreading sticks; (d) rest the tube carrying the partially (or fully) striped pastry bag on the counter at any time during the striping process; (e) rest the tube and striped pastry bag on the counter while filling the pastry bag with frosting; (f) hold the tube carrying the striped pastry bag that is partially filled with frosting while tapping the tube on the counter to remove air bubbles in the frosting without the nozzle touching the counter; (g) set the tube carrying the striped pastry bag and frosting on the counter while twisting the pastry bag closed; and (h) apply the closure clip to the twisted closed bag before removing the filled bag from the tube; all the while: (i) referring to the graphic illustration, which provides a set of step-by-step instructions for use of the components of the kit; and (j) watching the "How To" video which shows the use of the components of the kit.

This invention pertains to a method which comprises novel and unique steps, namely: (i) first, holding a cylindrical tube in one hand and tilting the tube in order to easily use the other hand to insert the bag into the tube by inserting the bag in through a first end and advancing the bag further into the tube by pulling the bag from the second end; (ii) second, standing the tube on a counter surface and using both hands to fold the top of the bag back over the rim of the tube and to pull the top of the bag taut against the rim of the tube to thereby seat the bag in a predetermined stationary position within the tube; (iii) third, loading a predetermined amount of a first coloring gel onto a first coloring gel spreading stick; (iv) fourth, holding the tube with the inserted bag in one hand and tilting the tube and bag such that the bag will not "collapse" and a first portion of the inside wall of the bag to be striped with the first coloring gel will remain "taut" and simultaneously striping the first portion of the inside wall with the first coloring gel using the second hand holding the first coloring gel spreading stick on which the first coloring gel has been loaded; (v) fifth, resting the tube and bag on a counter and repeating the third and fourth steps (i.e., with a second coloring gel and second coloring gel spreading stick, third coloring gel and third coloring gel spreading stick, etc.) until the entire inside wall of the pastry bag is striped with coloring gel; (vi) sixth, standing the tube on a counter during the frosting filling process, i.e., as frosting is dropped into the bag which is solidly held within the tube; (vii) seventh, tapping the tube on the counter to remove air bubbles from the frosting; (viii) eighth, resting the tube filled with frosting on the counter during the bag closing process, i.e., when the top of the bag is twisted shut; and (ix) ninth, applying a closure clip to the top of the bag; all the while: (x) referring to the graphic illustration, which provides a set of step-by-step instructions for use of the components of the kit; and (xi) watching the "How To" video which shows the use of the components of the kit.

Significantly, the novel and unique method of this invention allows even a user with small hands or limited manual dexterity to achieve the desired output.

It is, therefore, one of the primary objects of the disclosed invention to provide a kit and method for imparting color to the surface of food material as it is extruded out of a pastry bag.

A further object of the disclosed invention is to provide a kit and method for imparting color to the surface of food material as it is extruded out of a pastry bag, where the components of the kit used in practicing the method are critically dimensioned to facilitate ease of use.

A further object of the disclosed invention is to provide a kit and method for imparting color to the outer surface of food material as it is extruded out of a pastry bag, where the components of the kit used in practicing the method are critically dimensioned to ensure proper use.

A further object of the disclosed invention is to provide a kit and method that can enable the imparting of two or more colors to the outer surface of food material as it is extruded out of a pastry bag, employing components of the kit used in practicing the method that make the accomplishment of such effort both easy and accurate.

A still further object of this invention is to provide a kit and method which can be used with a traditional nozzle, DDB coupler plug and coupler collar.

A still further object of this invention is to provide a kit and method which can be used with a "Preferred Nozzle," i.e., a nozzle which has protrusions, serrations or ridges extending inwardly from the internal wall and running longitudinally or parallel along the length of the nozzle in accordance with the teachings of U.S. Pat. No. 8,794,959, such that the inwardly extending protrusions, serrations or ridges cut into the food material, causing the food material to split into alternating stripes of food material that: (a) has been in contact with the coloring gel on the internal wall of the bag and displays the effects of the coloring gel on the food material as it is expelled out through the nozzle; and (b) has not been in contact with the coloring gel on the internal wall of the bag and passes out through the nozzle without displaying any effect from the coloring gel.

In addition to the various objects and advantages of the present invention described with some degree of specificity above it should be obvious that additional objects and advantages of the present invention will become more readily apparent to those persons who are skilled in the relevant art from the following more detailed description of the invention, particularly when such description is taken in conjunction with the attached drawing figures and the appended claims.

DETAILED DESCRIPTION OF THE INVENTION

Figure 1:
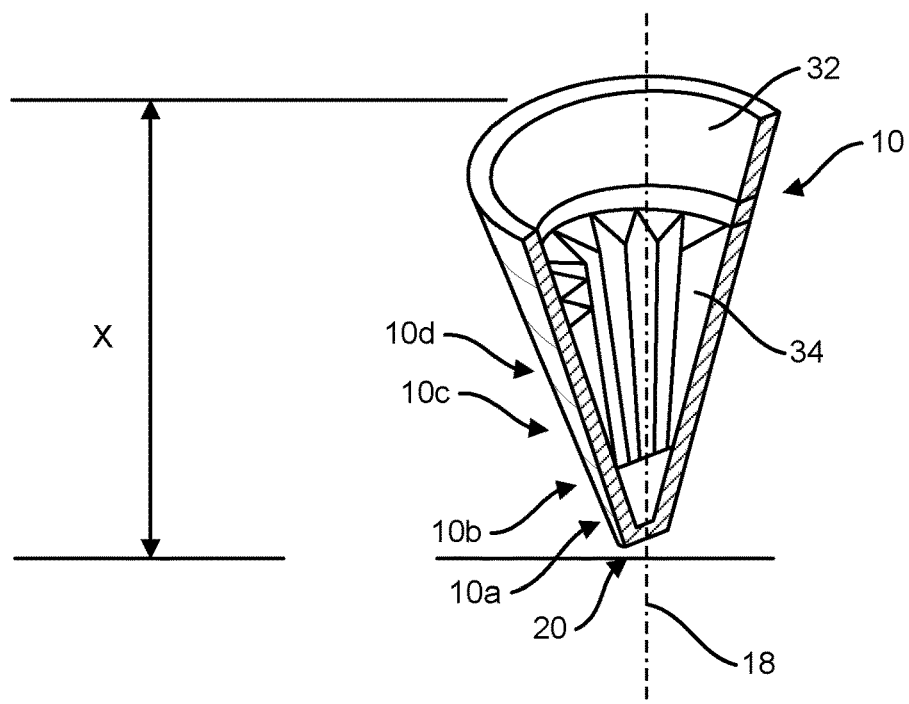
FIG. 1 depicts a sectional view of a nozzle which can be used with the kit of this invention which has protrusions, serrations or ridges extending inwardly from the internal wall and running longitudinally or parallel along the length of the nozzle (which length is denoted by the measurement "X"), in accordance with the teachings of U.S. Pat. No. 8,794,959 (i.e., the aforementioned Preferred Nozzle).

Prior to proceeding to the more detailed description of the present invention it should be noted that, for the sake of clarity and understanding, identical components which have identical functions have been identified with identical reference numerals throughout the several views illustrated in the drawing figures.

The kit of this invention can be used with a variety of viscous foodstuffs, i.e., foodstuffs with a thick, sticky consistency between solid and liquid, including icing or frosting, to decorate a variety of foods, such as cakes, cookies, canapés, pastry cups, meringue, etc.

The kit of this invention is a novel and unique combination of novel and unique components that work together in a novel and unique manner not taught by the prior art.

FIG. 1 depicts a sectional view of a Preferred Nozzle which can be used with the kit and method of this invention. The Preferred Nozzle is a conically shaped nozzle 10 with an internal wall 32, a conical longitudinal axis 18, a discharge opening or hole 20, and protrusions, serrations or ridges 34 extending inwardly from the internal wall 32 and running longitudinally or parallel along the length of the nozzle (which length is denoted by axis 18 and the measurement "X"), in accordance with the teachings of U.S. Pat. No. 8,794,959.

The nozzle 10 shown in FIG. 1 is made of a flexible material which can be "cut" with scissors at cut lines 10*a*, 10*b*, 10*c* or 10*d* to achieve a desired output opening size and, thus, a desired size of the food material that is output. For purposes of this invention, the nozzle 10 would be cut at either cut line 10*c* or 10*d* (i.e., at a point where the protrusions, serrations or ridges 34 extend inwardly from the internal wall).

Nozzles intended for use in this invention in a preferred embodiment can also be manufactured with the internal construction of the nozzle 10 of FIG. 1 and with the "cut" already made, i.e., each nozzle can have a predetermined output opening size and, thus, a desired size of the food material that is output. Such nozzles can be manufactured from an alternative material besides plastic, i.e., from any of the other materials out of which pastry bag nozzles are conventionally manufactured.

All that is critical is that the height of the nozzle is such that there is space between the counter and the nozzle when the bag 112 is loaded into the tube 110.

Figure 2:
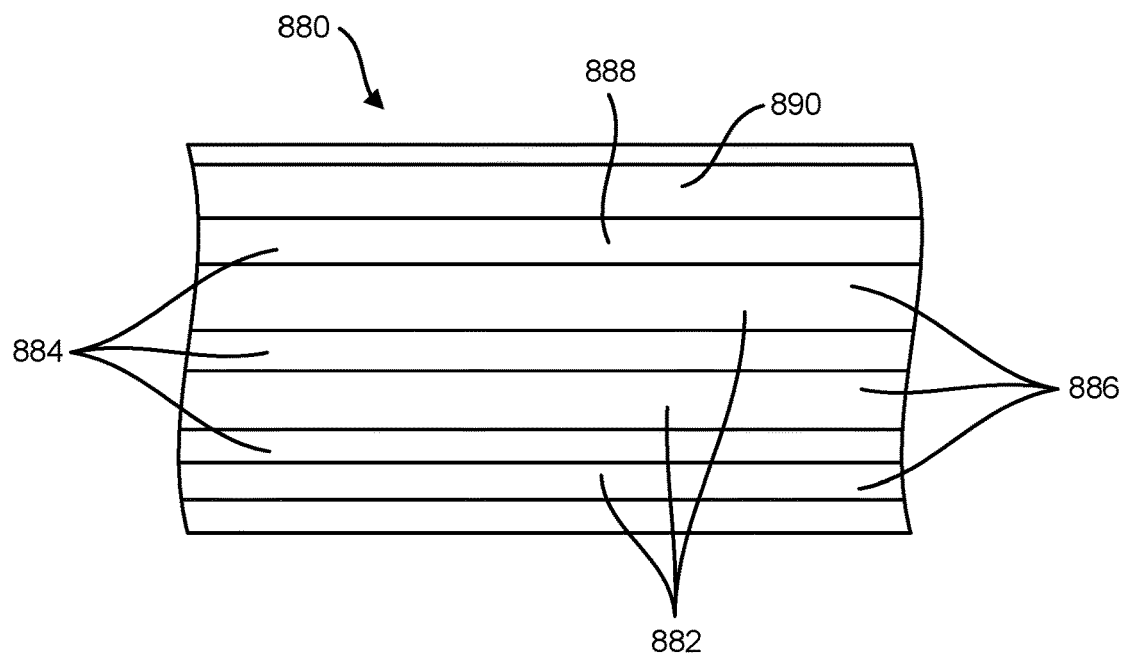
FIG. 2 is a top plan view of a stream of food material with a three-dimensional ribbon candy appearance expelled from the components of the kit of this invention using a Preferred Nozzle.

FIG. 2 is a top plan view of a straight line of food material 880 expelled with a three-dimensional ribbon candy appearance, achieved by using the components of the kit of this invention and a Preferred Nozzle. The food material 880 has channels 882 with peaks 884 and valleys 886, with a first color 888 on each of the channel peaks 884 and a second color 890 in each of the channel valleys 886.

The alternating stripes of color 888 and 890 on the peaks 884 and in the valleys 886 are produced by the ridges 34 of the nozzle 10 which treat the food material after color has been applied to the outer surface of the material by a coloring gel applied to the wall of the bag. More specifically, the ridges 34 cut into the food material and expose inner portions of the food material, i.e., valleys 886, that have not contacted the coloring gel and thus are non-colored portions 890, while at the same time the ridges 34 leave untouched outer portions of the food material, i.e., peaks 884, which have rubbed up against the coloring gel on the pastry bag wall and carry the color 888 as food material is extruded out of the nozzle.

Figure 3:
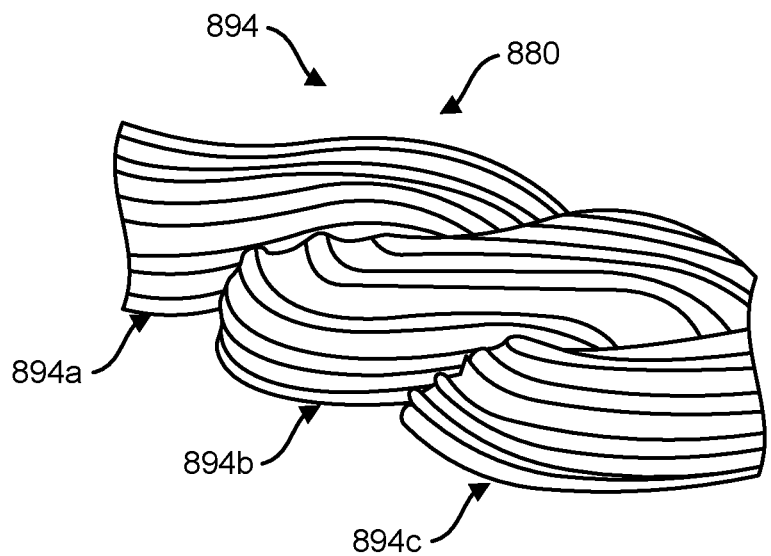
FIG. 3 and FIG. 4 are perspective views of streams of food material with a three-dimensional ribbon candy appearance produced with the components of the kit of this invention using a Preferred Nozzle and, through the manipulation of the components of the kit during expulsion, having different and unique decorating designs.
Figure 4:
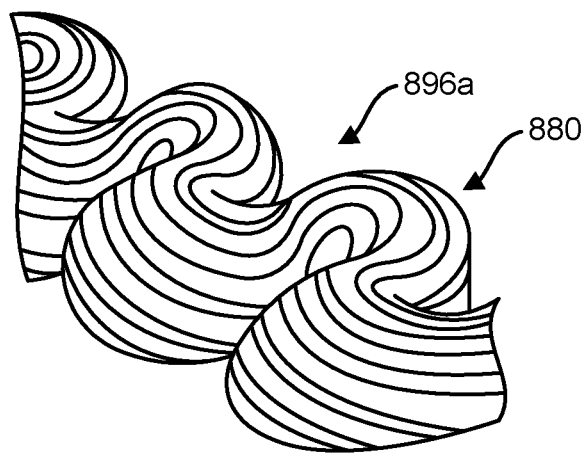

FIG. 3 and FIG. 4 show unique decorating designs that can be produced when food material 880 is "treated" with a nozzle like that shown in FIG. 1 to yield a three-dimensional ribbon candy appearance that is not possible with a DDB apparatus.

FIG. 3 shows a stream of food material 880 produced with a nozzle like that shown in FIG. 1 with a three-dimensional ribbon candy appearance and, through the manipulation of the components of the kit during expulsion, a "braid" design 894. A first "piece" of material 894a is expelled while moving the outlet of the nozzle from one side to the other and then back to and ending in the "center"—all the while making an "S" shape curve design. Then a second "piece" of material 894b is expelled with the same shape as the first, starting as if coming out of the side of the first, crossing over the "end" of the first and ending in the center in spaced relationship from the end of the first. Thereafter successive "pieces" of material 894c (etc.) are similarly produced to create a "braid" design.

FIG. 4 shows a stream of food material 880 produced with a nozzle like that shown in FIG. 1 with a three-dimensional ribbon candy appearance and, through the manipulation of the components of the kit during expulsion, a horizontally undulating "scallop" design 896a.

Figure 5:
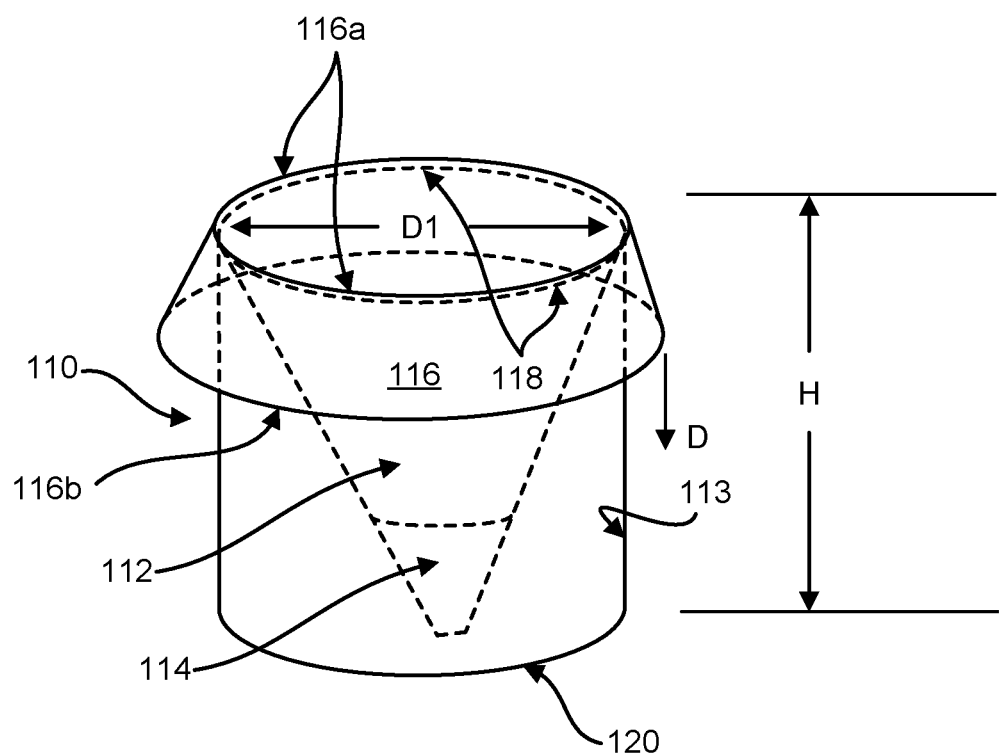
FIG. 5 is a perspective view of a tube of this invention partially loaded with a pastry bag of this invention. The nozzle attached to the pastry bag can be either a traditional DDB nozzle or a Preferred Nozzle.

FIG. 5 shows a perspective view of a cylindrical tube 110 of the kit in accordance with the teachings of this invention into which a pastry bag 112 with an attached nozzle 114 has been initially inserted. The construction of the pastry bag 112 can be the same as the construction of the pastry bag covered by the Parent Filings, and can include, in a preferred embodiment, an attached nozzle 10 shown in FIG. 1, all as covered by the Parent Filings. Or the pastry bag 112 can be a traditional pastry bag with a traditional DDB attached. In all cases, the pastry bag must have a generally conical shape below the approx. middle of the bag in order to be able to be used to practice this invention, all as more fully explained below.

In FIG. 5 the top portion 116 of the bag 112 has been: (i) rolled back over the top rim 118 of the tube 110; in preparation for (ii) pulling the top portion 116 of the bag 112 in a downward direction "D" as seen in FIG. 5 until the bag 112 lies tautly against the top rim 118 of the tube 110 as shown in FIG. 11B. In this manner, as seen in FIG. 11B, the bag 110 is suspended in a predetermined stationary position within the tube 112 and the bag 110 does not engage the inner wall 113 of the tube below the point where the bag 112 lies taut against the rim 118. In one embodiment, when the bag 112 is positioned within the tube 110, the angle "A" at which the bag 112 extends from the inner wall 113 of the tube 110 is in the range from approx. 5° to 22.5°. In another embodiment the angle is between 9° to 15°. In still a further exemplary embodiment, the angle is approx. 11.25°. These angles may be referred to as cone angles. The significance of the suspension of the bag 112 in a predetermined stationary position and of the cone angles is made clear in the description below.

FIG. 5 shows the critical height "H" and diameter "D1" of the tube 110. Specifically, such dimensions: (i) provide the tube 110 with the requisite internal volume to hold all of the other components of the kit of this invention during shipping and storage; and (ii) when the bag 112 is inserted into the tube 110 and the top portion 116 is rolled back over the top rim 118 and pulled taut against the top rim 118 as shown in FIG. 11B, the bag 112 is positioned in the desired predetermined stationary position within the tube 110 for practicing the invention. More specifically, in such desired predetermined stationary position within the tube, as seen in FIG. 11B: (a) the bag 112 assumes its generally conical-shape below the middle point of the bag and will not "collapse" on itself while the invention is practiced, i.e., while the tube 110 with the bag 112 inside is held in various tilted positions; (b) the bag 112 is held against motion as the coloring gel is applied to the inside wall of the bag 112; (c) coloring gel applied to one part of the inside wall of the bag 112 will not come in contact with any other part of the inside wall and/or in contact with coloring gel applied to any other part of the inside wall of the bag 112; and (d) when the tube 110 with the bag 112 inside is placed on a counter (not shown), a space "N" is provided between the output tip 114A of the nozzle 114 and the plane defined by the bottom rim 120 of the tube 110 so that the output tip 114A of the nozzle 114 will not touch the counter when the tube 110 with the bag 112 suspended within is standing on the counter.

Figure 6:
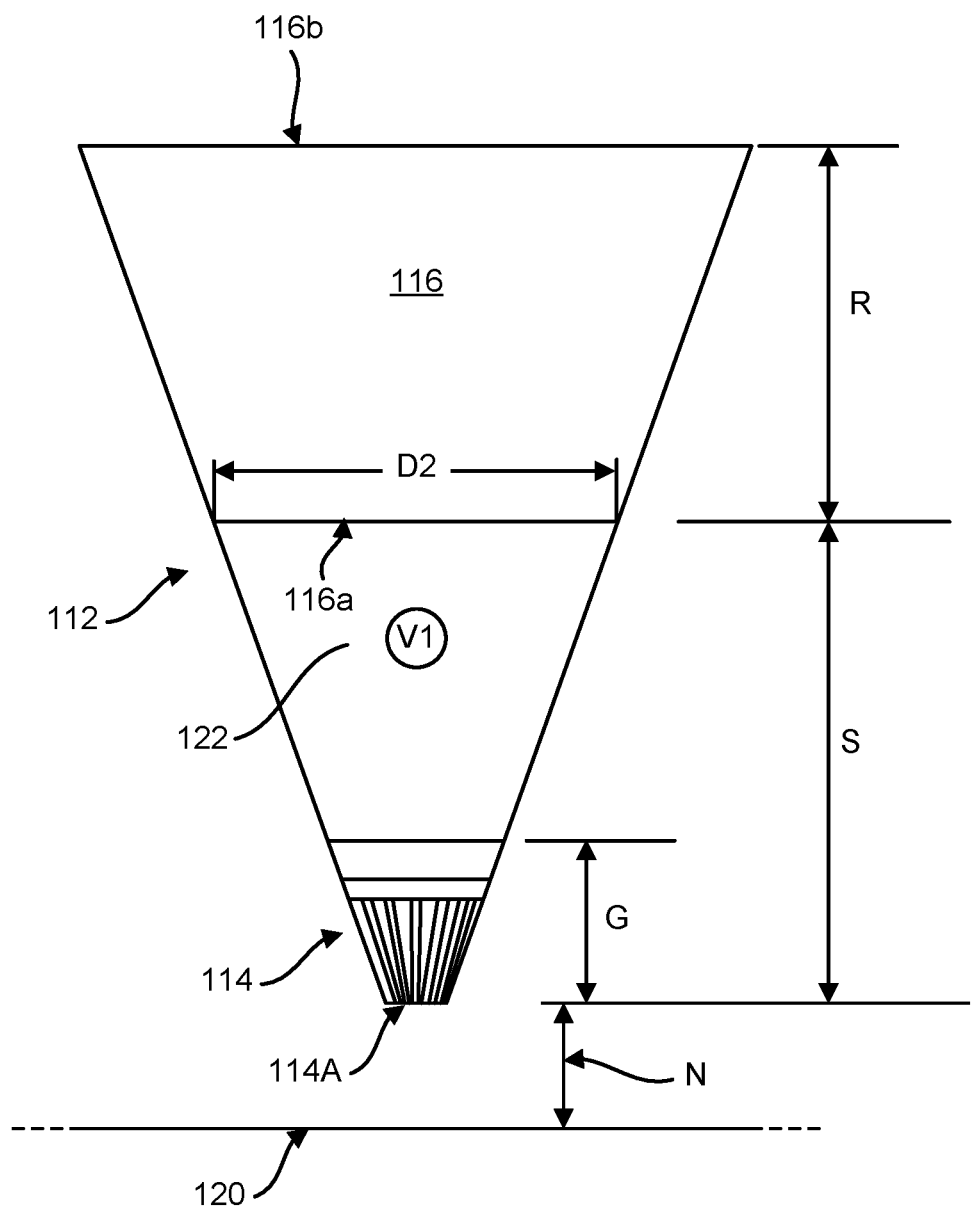
FIG. 6 is a side elevation of a pastry bag of this invention with an attached Preferred Nozzle.
Figure 12:
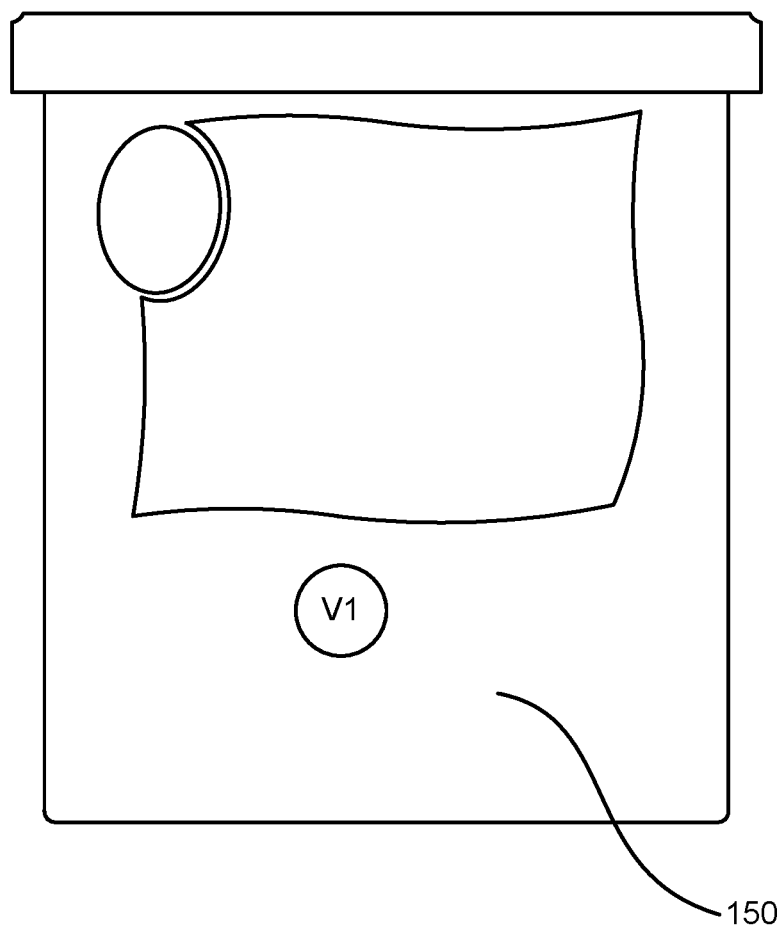
FIG. 12 is a perspective view of a 16 ounce can of frosting that contains the amount of frosting which precisely fills the pastry bag when the pastry bag is in the tube in the desired predetermined position as shown in FIG. 11B.

FIG. 6 shows a perspective view of the bag 112 with the attached nozzle 114, and the critical dimensioning of the bag and the nozzle. The plane defined by the bottom rim 120 of the tube 110 (not shown) is depicted by the line labeled 120. Specifically, the overall height of the bag 112 is a combination of two parts: (a) the aforementioned top portion 116 having a dimension "R" which extends from the fold line, i.e., the point 116a where the fold over the rim 118 of the tube 110 occurs, to the top edge 116b of the bag; and (b) a bottom portion 122 having a dimension "S" which extends from the point 116a where the fold over the rim 118 of the tube 110 occurs to the output tip 114A of the nozzle 114. The height of the bottom portion S is equal to the height "H" of the tube 110 minus the clearance "N" between the bottom 114A of the nozzle 114 and the counter. The height "G" of the nozzle 114, which is important in the coloring gel spreading process, which is explained later in connection with FIG. 8, and is also important in ensuring that the desired clearance "N" is achieved, in the preferred embodiment is approx. one (1). The volume of the bottom portion 122 of the bag 112 is an amount equal to "V1", which as explained later in connection with FIG. 12 is the volume of frosting contained in a container of frosting sold at retail.

Figure 7:
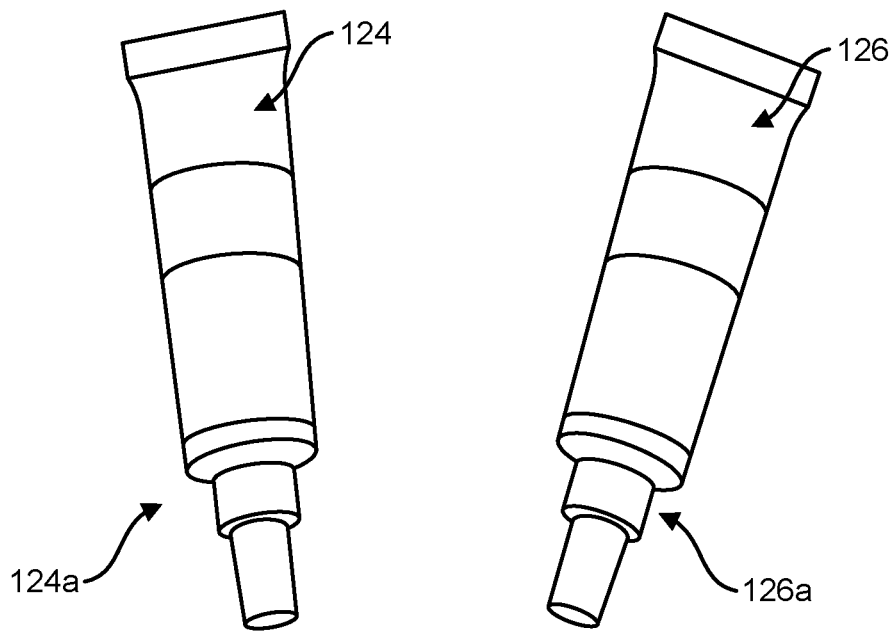
FIG. 7 shows two coloring gel tubes of this invention.
Figure 8:
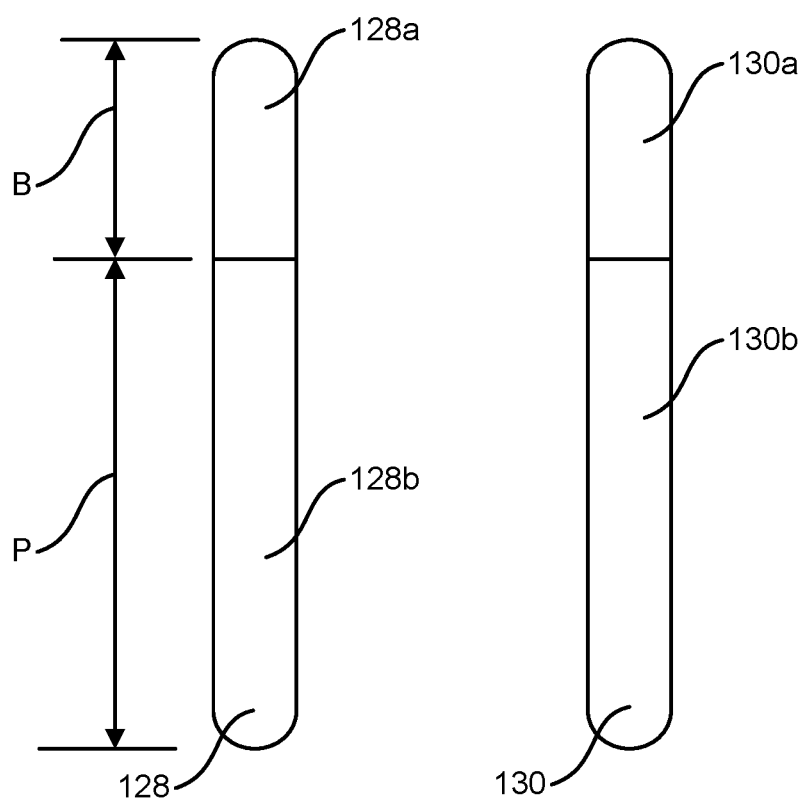
FIG. 8 shows two coloring gel spreading sticks of this invention.

FIG. 7 shows a perspective view of two tubes of coloring gel 124 and 126, each of which has a nozzle, 124a and 126a, respectively, for dispensing coloring gel from the tube in a controlled manner onto coloring gel spreading sticks 128 and 130 (shown in FIG. 8). The type of coloring gel used is critical, i.e., it must have a viscosity (i.e., resistance to flow or "thickness") such that it adheres and does not "run": (a) first, when applied to the coloring gel spreading sticks 128 and 130; and (b) second, when applied to the inside wall of the pastry bag 112.

FIG. 8 shows a perspective view of two coloring gel spreading sticks 128 and 130 each of which has an overall length of approx. six (6) inches so that it fits within the tube 110. Each stick 128 and 130 has a holding section, 128a and 130a, respectively, for the user to be able to hold the coloring gel spreading stick, and a spreading section, 128b and 130b, respectively, onto which coloring gel from a coloring gel tube 124 and 126 (such as shown in FIG. 7) is dispensed in a controlled manner for spreading purposes. The length "P" of each spreading section 128b and 130b is approx. four (4) inches, i.e., long enough to reach to all of the inside wall of the bottom portion 122 of the bag 112 onto which the coloring gel is spread, namely, approx. equal to the overall length "S" of the bottom portion 122 minus the height "G" of the nozzle 114 (since the coloring gel is not applied inside the nozzle 114). The length "B" of each holding section 128a and 130a is approx. two (2) inches, such that the holding section is large enough for the user to hold and manipulate the coloring gel spreading stick when applying coloring gel to the inside wall of the bottom portion 122 of the bag 112, namely, to just above the nozzle 114 (since the coloring gel is not applied inside the nozzle 114). The combined lengths "P" and "B" of the two sections must not be too large such that the coloring gel spreading stick cannot fit within the tube, i.e., the dimensions "P" plus "B" must not exceed the dimension "H" of the tube minus two times the thickness "L" of each end cap (as seen in FIG. 10).

Figure 9:
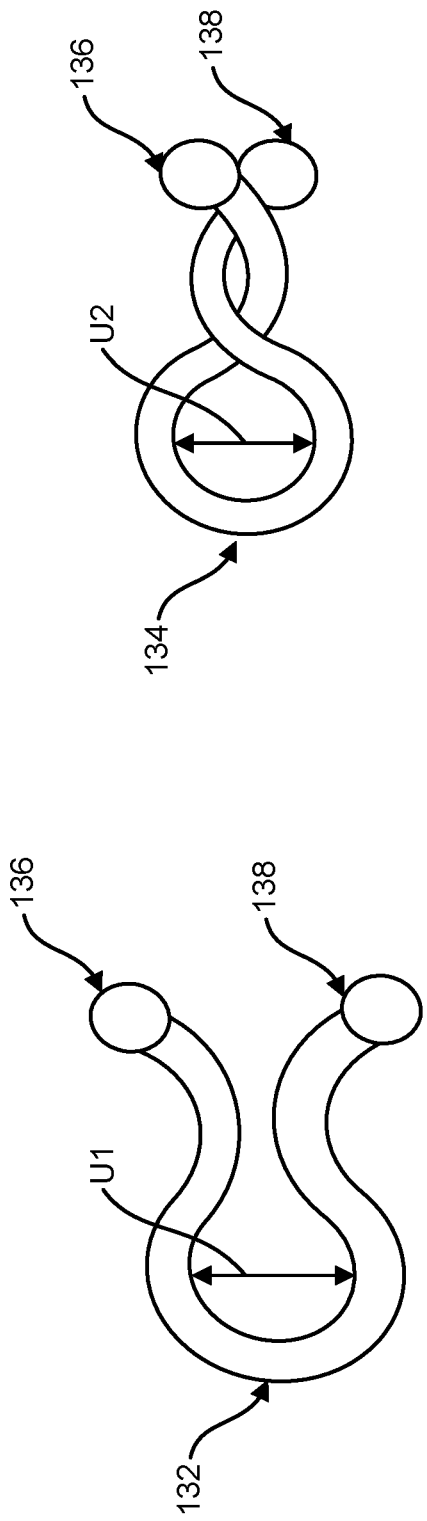
FIG. 9 shows two closure clips of this invention, one in the open position and the other in the closed position.

FIG. 9 shows a perspective view of two closure clips 132 and 134 made from a flexible material such as plastic. The first clip 132 is shown in the "open" position. The second clip 134 is shown in the "closed" position. The clips are changed from the "open" position to the "closed" position by applying the clip around the item to be held closed by the clip, in this case the twisted end 119 of the closed bag 112 and twisting the ends 136 and 138 over each other until they interlock. The dimension "U1" of the open clip 132 is slightly smaller than the dimension "W" of the twisted end 119 of the closed pastry bag (shown in FIG. 11C). The open clip 132 is placed around the top portion 116 of the bag 112 after it has been twisted closed by pressing the clip 132 against the twisted closed bag, which causes the ends 136 and 138 to flex outwardly until the clip 132 envelops the twisted closed bag 112. The ends 136 and 138 are then twisted so they interlock and cause the opening of the clip to change to the dimension "U2", which is significantly smaller than the dimension "W" and thus holds the top portion 116 of the bag 112 closed.

Figure 10:
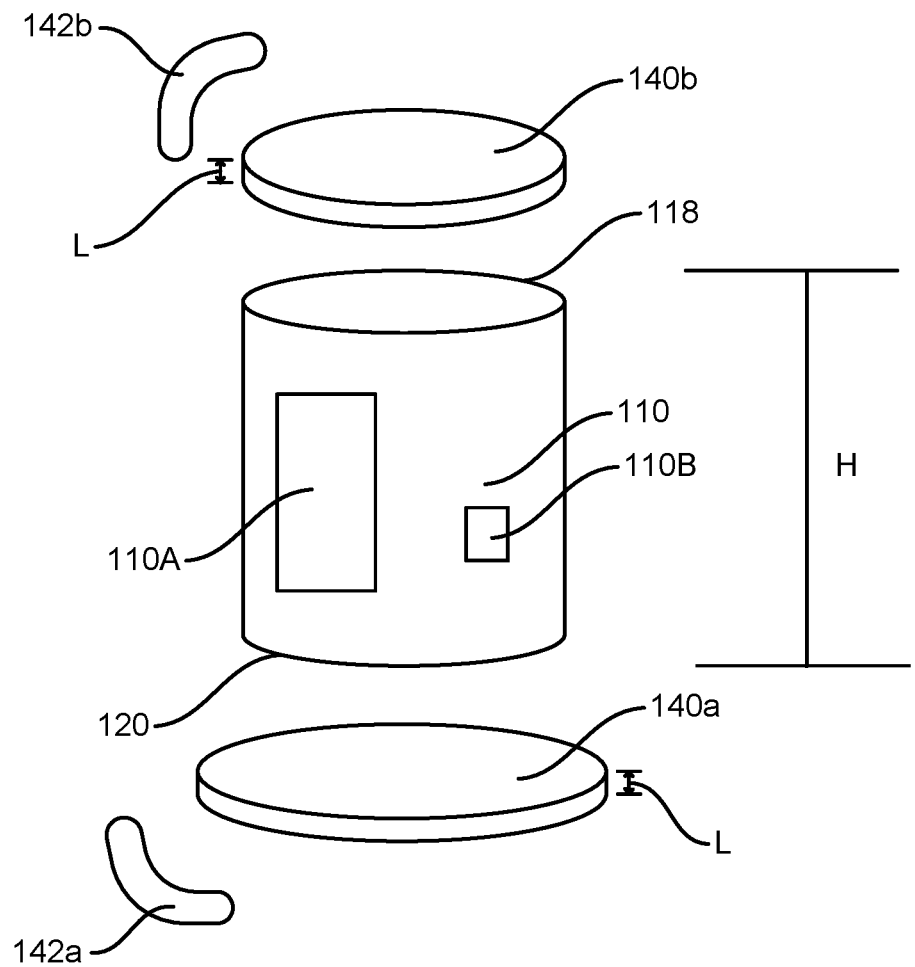
FIG. 10 is a perspective exploded view of the tube of FIG. 5, with end caps and tamper proof seals of this invention. The end caps are attached to the tube so as to hold the pastry bags of FIG. 6, the coloring gel tubes of FIG. 7, the coloring gel spreading sticks of FIG. 8 and the closure clips of FIG. 9 within the tube during shipment and storage. The tamper proof seals are attached to the tube and end caps so as to readily evidence whether or not there has been tampering with the contents of the tube during shipment. When the kit of this invention is ready for use, the tamper seals are broken and the end caps are removed from the tube. The outside of the tube includes not only a listing of the component parts contained inside, but also, step-by-step graphic instructions for how to use the components and a QR code linked to a "How To" video which a person can view on his/her smartphone when the person encounters the product in the store and contemplates whether to purchase the kit.

FIG. 10 is a perspective and exploded view of the tube 110, with end caps 140a and 140b that nest inside and engage the rims 118 and 120 of the tube 110 to close the two ends of the tube 110, and with tamper evident seals 142a and 142b that overlap the edges of the rims and caps, to provide visible evidence of whether the kit has been opened. Each end cap 140a and 140b has a thickness dimension "L" such that when the end caps are inserted into the tube 110, the inside dimension of the tube is reduced by an amount equal to twice "L". In other words, the resulting usable inside of the tube 110 has a dimension of H-2L. If the height "H" of the tube 110 is seven (7) inches and the thickness "L" of each cap 140a and 140b is one half (½) inch, the resulting usable inside space of the tube 110 is six (6) inches.

The tube 110 has graphical use instructions 110A on its outer surface, which are either printed on the tube during manufacture or printed on a label which is applied to the tube 110 after manufacture. In addition, the tube 110 also has a quick response or "QR" code 110B on its outer surface, which is either printed on the tube during manufacture or printed on a label which is applied to the tube 110 after manufacture. A QR code is a two-dimensional version of the Barcode which is able to convey a wide variety of information almost instantly with the scan of a mobile device. In this case, when the user scans the QR code with their smartphone, they see a "How To" video for the invention. Thus, the user is able to both follow the graphic use instructions 110A and the "How To" video brought up on their smartphone by the QR code 110B.

Figure 11A:
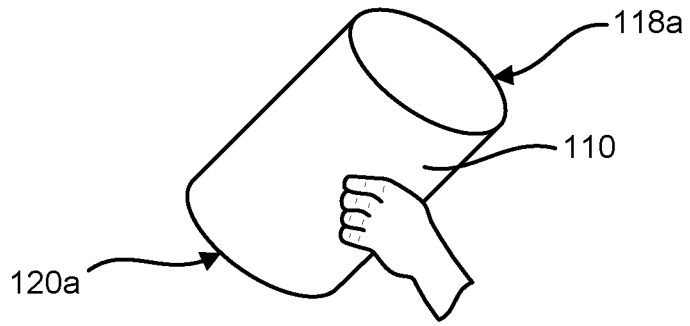
FIGS. 11A, 11B and 11C, respectively, show perspective views of: (A) the tube in the "tilted" position for: (a) inserting the pastry bag; and (b) striping; (B) the tube in the "standing" position on the counter for: (a) folding the pastry bag back over the rim of the tube; (b) pulling the bag taut and thereby positioning the bag at a desired/predetermined position within the tube; (c) resting the tube and loaded bag on the counter during the striping and filling process; (d) filling the bag with frosting; and (e) tapping the tube on the counter for removing air pockets that build up in the frosting in the bag; and (C) the tube in the "standing" position with the pastry bag filled with frosting for: (a) closing the end of the pastry bag by twisting the top closed; and (b) applying the closure clip.
Figure 11B:
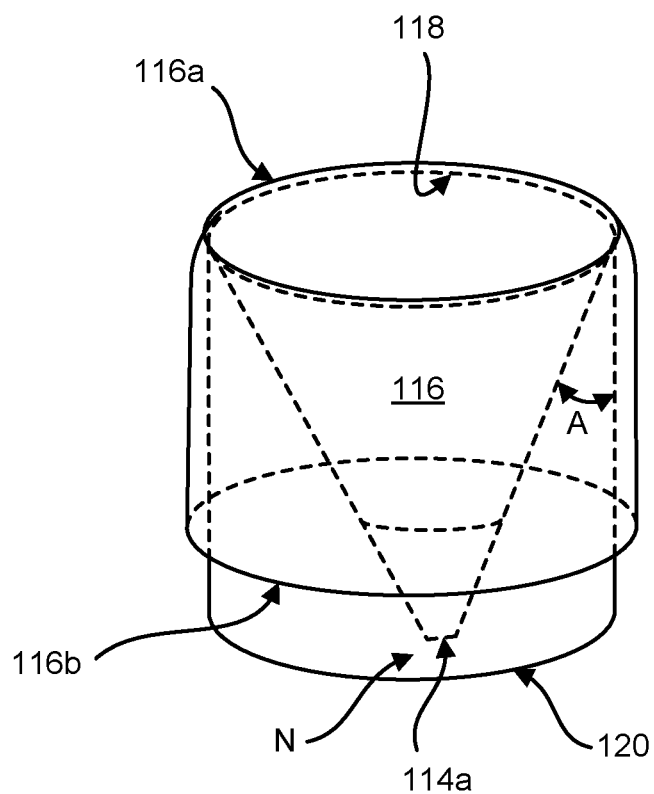
Figure 11C:
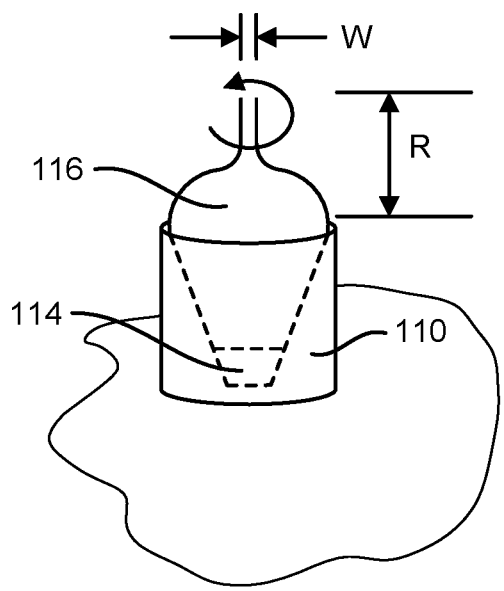

FIGS. 11A, 11B and 11C are perspective views of the components of the kit at different points during practicing of the method.

In FIG. 11A the tube 110 is shown being held in a tilted position by the user's one hand. In this position, the bag 112 can be inserted into one end 118A of the tube 110, and advanced into the tube 110 by accessing the bag 112 and pulling it through the other end 120A of the tube 110.

In FIG. 11B the tube is shown in the upright position standing on the counter. In this position, the top portion 116 of the bag 112 has been folded down over the rim 118 of the tube 110 and the top portion 116 of the bag 112 has been pulled taut against the rim 118 by the user with two hands to thereby cause the bag 112 to assume a desired predetermined stationary position within the tube 110.

Once in this predetermined stationary position, the bag 112 can be striped, i.e., the tube 110 with the bag 112 inside can be picked up in the manner shown in FIG. 11A and coloring gel can be applied to a desired section of the inside wall of the bottom portion 122 of the bag 112. Importantly, the tube 110 can easily be rotated in the user's hand so that the section of the inside wall of the bottom portion 122 of the bag 112 which is being striped can be positioned at the downward position or eye level thereby facilitating easy application of the coloring gel to the inside wall of the bag.

As the process continues and the bag remains in the predetermined stationary position: (a) the tube 110 can be rested in between steps in the striping process; (b) once the striping process is finished, frosting can be added to the fully striped bag; (c) as the frosting filling process progresses, the tube and bag filled with frosting can be tapped on the counter to release air bubbles from the frosting; and (d) finally, the top portion 116 of the bag 112 can be twisted closed.

In FIG. 11C the tube is shown in the upright position standing on the counter with the top portion 116 of the bag 112 twisted closed. In this position the open closure clip 132 can be applied to the twisted closed top portion 116, and then the closure clip can be twisted closed until the clip assumes the closed position shown by clip 134. The dimensioning of the clip is critical, i.e., the open clip 132 must be able to be flexed far enough open so as to go around the twisted closed top portion 116 of the bag 112 (i.e., the clip must be able to be flexed open beyond the "open" dimension "U1" so as to envelop the twisted top portion 116 of the bag 112 having a dimension "W"), and the closed clip 136 must be able to securely engage and hold closed the twisted top portion 116 of the bag 112 once the clip is twisted closed (i.e., the "closed" dimension "U2" must be sufficiently smaller than the dimension "W"). Once the clip is applied, the bag 112 is ready to be removed from the tube 110 and, after the requisite refrigeration, which in a best mode has been found to be approx. fifteen minutes, the bag is ready to be held and the sides of the bag 112 squeezed so as to extrude the colored frosting output.

FIG. 12 is a perspective view of a 16 ounce can of frosting 150, which has been found to be the amount of frosting needed to fill the volume "V1" of the bottom portion 122 of the bag 112 defined by the area beneath the fold line 116a at the rim 118 of the tube 110.

In the best mode embodiment of this invention, the components have the following critical dimensions, to thereby best facilitate the desired interworking of the components and assure that the desired results are achieved in practicing the invention:

a. the height ("H") of the tube 110 is seven (7) inches;
    b. the diameter ("D1") of the tube 110 is three (3) inches;
    c. the bag 112 is what is commonly referred to as a twelve (12) inch pastry bag: the measurements of the bag 112 can vary depending upon how the bag was manufactured—indeed, the pastry bag may not be a perfect cone shape, i.e., the upper portion may, in fact, be cylindrical in shape; all that matters is that the bag 112 has a conical shape below the fold line 116a of the bag 112 so that the bag 112 can tautly engage the rim 118 of the tube 110 at the fold line 116a and hang there beneath in spaced relation to the inside wall of the tube 110, i.e., with a cone angle of approx. 11.25°;
    d. the length ("R") of the top portion 116 of the bag 112 extending from the top end 116b of the bag 112 to the fold line 116a is approx. six (6) inches;

e. the length ("S") of the bottom portion 122 of the bag 112 extending from the fold line 116*a* to the bottom tip 114*a* of the nozzle 114 is approx. six (6) inches;
f. the diameter ("D2") of the bag 112 at the fold line is three (3) inches (i.e., self-evidently, the same diameter as that of rim 118 of the tube 110);
g. the clearance distance ("N") between bottom edge 114*a* of the nozzle 114 and the plane defined by the bottom 120 rim of the tube 110 (and, hence, between the bottom edge 114*a* of the nozzle 114 and the counter on which the bottom rim 120 of the tube 110 sits with the loaded bag 112) is approx. one (1) inch;
h. the volume ("V1") of the bottom portion 122 of the bag 112 when the bag 112 is loaded into the tube 110, i.e., the volume ("V1") of the interior area of the bag 112 below the fold line 116*a* is approx. the volume of a sixteen (16) ounce can of frosting sold in grocery stores;
i. the volume of each coloring gel tube 124 and 126 is 0.67 ounces and, in a preferred embodiment, approx. one fourth (¼) of the coloring gel in the coloring gel tube 124 or 126 is expended onto the coloring gel spreading stick 128 or 130 during each stage of striping;
j. the length ("B") of the holding area of each coloring gel spreading stick 128 and 130 is two (2) inches;
k. the length ("P") of the coloring gel spreading area of each coloring gel spreading stick 128 and 130 is approx. four (4) inches, i.e., long enough to reach to all of the inside wall of the bottom portion 122 of the bag 112 onto which the coloring gel is spread, namely, approx. equal to the overall length "S" of the bottom portion 122 minus the height "G" of the nozzle 114 (since the coloring gel is not applied inside the nozzle 114);
l. the thickness ("L") of each end cap is one half (½) inch, such that the fully closed tube 110 with the two end caps inserted has an internal height of six (6) inches;
m. the thickness ("W") of the twisted top portion 116 of the bag 112 is approx. one half (½) inch;
n. the space ("U1") within each closure clip 132 and 134 when in the "open" position is approx. seven sixteenth (7/16) of an inch; and
o. the space ("U2") within each closure clip 132 and 134 when in the "closed" position is approx. five sixteenth (5/16) of an inch.

The advantage of the kit of this invention is that all of the correctly sized components needed to be used to achieve the desired result are sold in one package, namely, in the tube 110 which serves as both the packaging/shipping container and, in use, the filling stand.

In terms of operation of the invention, the kit which is shipped to the user fully assembled is broken down into its component parts, i.e.: (i) the tamper evident seals 142*a* and 142*b* that overlap the edges of the rims and caps are broken; (ii) the end caps 140*a* and 140*b* that nest inside and engage the ends 118A and 120A of the tube 110 to close the two ends of the tube 110 are removed; and (iii) the contents of the tube 110 are removed, namely, the bags 112, the tubes of coloring gel 124 and 126, the coloring gel spreading sticks 128 and 130 and the closure clips 132 and 134. Without departing from the scope of this invention, the number of bags, number of tubes of coloring gel, number of coloring gel spreading sticks and number of closure clips provided in the tube 110 can be varied depending upon the output intended to be accomplished with the kit.

The method of this invention involves the steps of:
a. picking the tube 110 up in one hand and tilting the tube 110;
b. inserting the bag 112 into the tube 110 through one end 118A using the other hand;
c. advancing the bag 112 into the tube by reaching into the tube 110 through the other end 120A and grasping and pulling the bag 112 into the tube 110 with the other hand;
d. standing the tube 110 with the bag 112 inserted on a counter and folding the top portion 116 of the bag 112 over the top rim 118 of the tube 110 using both hands;
e. while the tube 110 remains standing on the counter, pulling the top portion 116 of the bag 112 down in the direction "D" taut against the rim 118 of the tube 110 using both hands to position the bag 112 within the tube 110 in a desired predetermined stationary position;
f. applying a predetermined amount of a first coloring gel from a first coloring gel tube 124 (approx. one fourth (¼) of the coloring gel in the 0.67 oz tube) onto a first coloring gel spreading stick 128 using both hands;
g. picking the tube 110 loaded with the bag 112 up again with one hand and tilting the tube and bag combination in order to position them to facilitate spreading of the first coloring gel on the inside wall of the bag, i.e., where the section of the inside wall of the bag to be striped is in the downward position and at eye level;
h. applying the first coloring gel to the inside wall of the bag 112 with the other hand;
i. resting the tube 110 and bag 112 with the first coloring gel applied on the counter while applying a predetermined amount of a second coloring gel from a second coloring gel tube 126 (again, approx. one fourth (¼) of the coloring gel in the 0.67 oz tube) onto a second coloring gel spreading stick 130 using both hands;
j. picking the tube 110 loaded with the bag 112 and first coloring gel up again with one hand and tilting the tube and bag combination in order to position them to facilitate spreading of the second coloring gel on the inside wall of the bag, again where the section of the inside wall of the bag to be striped is in the downward position and at eye level;
k. applying the second coloring gel to the inside wall of the bag 112 with the other hand;
l. repeating steps "I", "j" and "k" until the desired number of coloring gels have been applied to the desired number of sections of the inside wall of the bag;
m. resting the tube 110 and bag 112 with the desired number of coloring gels applied on the counter while loading frosting on a dispensing tool using both hands—it has been found that a large spoon works the best;
n. while the tube 110 and bag 112 with the desired number of coloring gels is resting on the counter, stabilizing the tube 110 with one hand and causing the dispensing tool to drop gobs of frosting into the bag 112 using the other hand;
o. continuing step "n" until all of the frosting is loaded into the bag, i.e., until the volume of frosting "V1" in the frosting container is dropped in the area "V1" of the bag 112;
p. intermittently tapping the tube on the counter during steps "n" and "o" so as to release air bubbles in the frosting;
q. while the tube 110 and bag 112 with the desired number of coloring gels and frosting is resting on the counter, twisting the top portion 116 of the bag 112 closed using both hands;

r. while the tube 110 and bag 112 with the desired number of coloring gels and frosting is still resting on the counter, with the top portion being held twisted closed with one hand, applying the closure clip with the other hand; and s. finally, removing the bag 112 loaded with frosting from the tube 110 and, after refrigerating the bag 112 for fifteen (15) minutes, commencing dispensing of the frosting.

In a preferred embodiment of the method of this invention, the bag is pulled taut until the cone angle is approx. 11.25°.

If the kit is used with a traditional or conventional pastry bag with a traditional or conventional DDB attached as described above in the context of FIG. 5, the bag and DDB can be made of any materials without departing from the scope of this invention so long as the critical dimensioning is observed. Indeed, even a one-piece pastry bag with an attached tip can be used notwithstanding the fact that such one-piece pastry bag with an attached tip may not practice the invention covered by U.S. Pat. No. 8,794,959.

If the kit is used with a Preferred Nozzle, the nozzle should be cut approx. one half way up the nozzle, i.e., at cut line 10c or cut line 10d or approx. where one achieves a one half (½) inch orifice opening or size.

Regardless of what nozzle is used, the nozzle must have an open end so that as the tube 110 is tapped on the counter to remove air bubbles, the frosting can shift down within the bag 112, i.e., so that an air pocket is not trapped beneath the frosting and above the end of the nozzle.

It is important which frosting is used in practicing this invention, particularly when using a Preferred Nozzle. The best sixteen (16) ounce cans of frosting available in grocery stores (in order of efficacy) were found to be:

1. Pillsbury® White Frosting
2. Duncan Hines® Creamy Vanilla; Betty Crocker® Rich Creamy Vanilla; Pillsbury® Creamy Supreme Vanilla What should not be used under any circumstances when practicing this invention with a Preferred Nozzle is any brand of "whipped" frosting as the consistency of such frosting is not "stiff enough" to hold the desired output shape.

The best frosting was found to be Sam's Club But-R-Crème® white buttercream icing. Unfortunately, this frosting comes in a bulk container and thus has much more frosting per container than what the user needs to fill the bag 112 up to the fold line 116a. A recipe purportedly for making this frosting at home can be found at: Amazing Copycat Sam's Club Buttercream Frosting Recipe (cakedecorist.com).

Applicants acknowledge that pastry bags, nozzles for pastry bags, stands for holding pastry bags during the filling process, coloring gels for striping pastry bags, coloring gel spreading sticks and closure clips, graphical instructions and QR codes are all well known. What is not known, however, and what is novel and unique, is the kit and method of this invention which include and make use of components of unique sizes and shapes and accompanying instructions and "How To" video disclosed by this invention which make the creation of multi-colored food material output of the type described herein possible.

As is readily apparent to anyone skilled in the art of decorating, many multi-colored output designs, including with or without a ribbon candy appearance as described herein, that were heretofore not readily and conveniently possible are now possible through the novel and unique design of the kit and method of this invention. Although some embodiments have been described with respect to a Preferred Nozzle, note that any embodiments might instead be associated with other types of nozzles (e.g., a non-disposable metal nozzle). While the preferred embodiments of the invention have been shown and described, it will be apparent to those skilled in the art that changes and modifications may be made therein without departing from the spirit of the invention, the scope of which is defined by the appended claims.

We claim:

1. A kit for use in turning plain food material into a stream of food material with sides having different colors, said kit comprising:

a cylindrical tube, wherein said tube is configured with a length and a diameter and an internal volume to serve as a shipping and storage container for the kit, and further, wherein said tube is configured to serve as a filling stand for the kit when said kit is rested on a counter, said tube having a circular shaped first end, a circular shaped second end and an internal wall between them;

a first circular shaped end cap, wherein said first cap is configured to frictionally engage and close said first end of said tube;

a second circular shaped end cap, wherein said second cap is configured to frictionally engage and close said second end of said tube;

at least one pastry bag which fits within said tube when it is closed for shipping and storage purposes, wherein said bag can be: (i) inserted into said tube when it is open by inserting said bag through said first end; (ii) advanced further into said tube by pulling on said bag through said second end; and (iii) ultimately suspended within said tube; wherein said bag is configured with a size and a shape relative to said length and said diameter of said tube, including a conically shaped wall portion, such that when said bag is suspended within said tube said conically shaped wall portion engages said first end of said tube, such that said bag is held in said tube in a predetermined stationary position, said bag will not "collapse" when said tube with said bag inserted is held in one hand and tilted, and wherein said bag has an internal wall to which coloring gel can be applied and said internal wall of said bag will remain "taut" while said tube with said bag inserted is held in one hand and tilted;

at least one output nozzle which fits within said tube when it is closed for shipping and storage purposes, wherein said nozzle is configured to be attached to said pastry bag and, once said pastry bag is striped, filled with frosting and closed, serves to achieve the desired output of a stream of food material with sides having different colors, and further, wherein said length and diameter of said tube and said size and shape of said bag cooperate to ensure that said nozzle, when attached to said pastry bag suspended within said tube, does not extend out of said second end of said tube and touch the counter when said tube is rested on the counter;

at least one coloring means which fits within said tube when it is closed for shipping and storage purposes, which coloring means can be used for the purpose of striping said internal wall of said bag;

at least one coloring spreading means which fits within said tube when it is closed for shipping and storage purposes, which coloring spreading means can be used to spread said coloring means on said internal wall of said bag; and at least one closure means which fits within said tube when it is closed for shipping and storage purposes, which closure means can be used to close the end of said bag once the bag has been striped, filled with frosting and twisted closed.

2. A kit in accordance with claim 1, wherein the length and diameter of said tube are such that said tube can be: (i) held by a user in one hand and tilted in order to permit the user to insert said bag into and adjust a position of said bag within said tube with the other hand; (ii) stood on said second end on the counter while the user uses both hands to fold a top end of said bag over said first end of said tube and to pull said top end of said bag against said first end of said tube to seat said conical portion of said bag against said first end and thereby cause said bag to remain in a predetermined stationary position within said tube; (iii) intermittently stood on said second end on the counter as the user prepares to stripe said internal wall of said bag; (iv) intermittently held by the user in one hand while the user tilts said tube in order to stripe said internal wall of said bag with the other hand; (v) stood on said second end on the counter as frosting is dropped into said bag which is held within said tube; (vi) intermittently tapped on the counter to remove air bubbles from the frosting; and (vii) stood on said second end on the counter while said top end of said bag is twisted closed.

3. A kit in accordance with claim 2, wherein when said bag is suspended within said tube and said conically shaped wall portion engages said first end of said tube such that said bag is held in said tube in a predetermined stationary position, said conically shaped wall portion extends from said internal wall of said tube at an angle.

4. A kit is accordance with claim 3, wherein the angle is in the range from approx. 5° to 22.5°.

5. A kit is accordance with claim 3, wherein the angle is in the range from approx. 9° to 15°.

6. A kit in accordance with claim 3, wherein the angle is approx. 11.25°.

7. A kit in accordance with claim 2, wherein said nozzle is attached to said bag and has an internal wall and protrusions, serrations or ridges extending inwardly from said internal wall and running longitudinally or parallel along a length of the nozzle.

8. A kit in accordance with claim 2, wherein said coloring means comprises a tube of coloring gel, said coloring gel having a viscosity such that it adheres and does not "run" first when applied to said coloring spreading means and second when applied to said internal wall of said pastry bag.

9. A kit in accordance with claim 8, wherein said coloring spreading means comprises a stick having two sections, a first section which remains free of said coloring gel and can be held by the user and a second section on which said coloring gel is applied and which is long enough to enable the user to insert said coloring gel spreading stick into said bag and apply said coloring gel on said internal wall of said bag from a first point just above where said bag and said nozzle connect to a second point where said bag folds over said first end of said tube.

10. A kit in accordance with claim 2, wherein said closure means comprises a generally U-shaped clip made from a flexible plastic, having first and second ends, configured so that the user can force said ends of said clip apart as said clip is in an open position and is pushed against said twisted top end of said bag to cause said clip to envelop said twisted top end of said bag and so that when said clip envelops said twisted top end of said bag the user can rotate said ends of said clip until they interlock in a closed position.

11. A kit in accordance with claim 2, wherein said tube has an outside wall, a set of step-by-step graphical instructions mounted on said outside wall which explain how the kit is used, and a QR code mounted on said outside wall linked to a "How To" video which a person can view on his/her smartphone which demonstrates how to use the kit.

12. A kit in accordance with claim 1, wherein said nozzle is adapted to be inserted into said bag before said bag is inserted into said tube.

13. A kit in accordance with claim 1, wherein said nozzle is pre-attached to said bag.

14. A kit in accordance with claim 1, wherein said kit further includes a coupler, and wherein said coupler is used to attach said nozzle to said bag before said bag is inserted into said tube.

15. A kit in accordance with claim 1, wherein said nozzle is pre-attached to said bag and said nozzle has an internal wall and protrusions, serrations or ridges extending inwardly from said internal wall and running longitudinally or parallel along a length of the nozzle.

* * * * *